United States Patent [19]

Koll et al.

[11] Patent Number: 4,842,195
[45] Date of Patent: Jun. 27, 1989

[54] APPARATUS AND METHODS FOR DIRECTING SPRAY NOZZLES

[76] Inventors: Laurel A. Koll, P.O. Box 3 - One Juniper La.; John E. Watts, Rte. 1 Box 750, both of Ruleville, Miss. 38771

[21] Appl. No.: 145,280

[22] Filed: Jan. 19, 1988

[51] Int. Cl.$^4$ .............................................. B05B 17/00
[52] U.S. Cl. .......................................... 239/1; 239/73; 239/176; 239/390; 222/41; 222/47; 47/1.7
[58] Field of Search ............... 239/71, 73, 288, 391, 239/396, 451, 172, 176, 502, 503, 505, 507, 513, 518, 390, 397; 116/264, 265, 275; 222/47, 41; 47/48.5, 1.5, 1.7; 118/305

[56] References Cited

U.S. PATENT DOCUMENTS

| | | |
|---|---|---|
| 641,295 | 1/1900 | Jackson . |
| 1,149,673 | 8/1915 | Nice ................................... 239/581 |
| 1,188,131 | 6/1916 | Agee ........................................ 47/1.7 |
| 1,521,863 | 1/1925 | Brockschmidt ..................... 239/505 |
| 1,741,169 | 12/1929 | Thompson .......................... 239/510 |
| 2,342,757 | 2/1944 | Roser . |
| 2,591,073 | 4/1952 | Jepson . |
| 2,683,626 | 7/1954 | Wahlin . |
| 2,911,157 | 11/1959 | Converse . |
| 2,980,340 | 4/1961 | McEachern . |
| 2,995,173 | 8/1961 | Nawalanic . |
| 3,231,199 | 1/1966 | Mattson . |
| 3,237,346 | 3/1966 | Watts ........................................ 47/1.7 |
| 3,270,966 | 9/1966 | Ackley . |
| 3,445,961 | 5/1969 | Elsworth ............................... 239/288 |
| 4,053,108 | 10/1977 | Hofmann ............................. 118/305 |
| 4,479,610 | 10/1984 | Etheridge et al. . |
| 4,596,362 | 6/1986 | Pralle et al. . |
| 4,602,742 | 7/1986 | Penson . |

*Primary Examiner*—Andres Kashnikow
*Assistant Examiner*—Christopher G. Trainor
*Attorney, Agent, or Firm*—Nixon & Vanderhye

[57] ABSTRACT

A device for determining the direction of a fluid spray pattern issuing from a fluid nozzle prior to flowing through the nozzle includes a body in the form of a template or a jig releasably attachable in a predetermined orientation to the nozzle tip. The body includes a pair of angularly related adjustable arms having axes which intersect the nozzle aperture and which extend such that the central axis of the nozzle bisects the angle between the arms. By applying the device to the nozzle tip in predetermined orientation, the arms define the lateral extremities of the spray pattern.

19 Claims, 2 Drawing Sheets

APPARATUS AND METHODS FOR DIRECTING SPRAY NOZZLES

BACKGROUND AND SUMMARY OF THE INVENTION

The present invention relates to novel and improved apparatus and methods for accurately setting spray nozzles used for various types of spraying operations, such as directed pre-emergence and post-emergence spraying of row crops. More particularly, the present invention relates to a jig or template for application to a spray nozzle and methods for determining the direction of the spray pattern prior to flowing fluid through the spray nozzle.

Many agricultural crops require spraying with certain herbicidal or other chemicals that must be directed to specific areas of the crop row so as to not contact the plant because contact with the plant would injure or kill the plant. Thus, only defined areas adjacent the row are to be sprayed. This requires the spray nozzles to be set very precisely, both for proper coverage of the target area as well as to prevent contact of the spray pattern with the plant. Alternately, certain chemicals are applicable directly to the plants and it is desirable to direct the spray nozzles such that maximum plant coverage with minimum wastage is obtained. In both cases, it is important that the spray nozzles be accurately directed.

Current spraying techniques typically employ a farm tractor equipped with a spraying system. The spraying system includes a rig having a header with several nozzles attached thereto for each row, with the spraying unit generally covering from four to twelve rows at one time. Initially, the chemical tank on the spraying rig is filled with water and the tractor driven onto the field and lined up with the crop rows. Typically, the spraying system is then turned on and sprays onto the ground. Frequently, there will be some residual chemicals in the system, from previous spraying operations, that will be sprayed with the water and which can cause damage to the crop and the immediate ground area and possibly injure the individuals setting the nozzles. In any event, the ground area sprayed immediately becomes very muddy, and a very fine spray of particles becomes airborne, making the area extremely wet and messy. Each nozzle must then be loosened, set to its proper height and angle by observation of its spray pattern and then tightened in its adjusted position, all while the water is being sprayed from the nozzles. Before the first row is properly set, the individual setting the nozzles is wet at least from the knees down. The fine particles floating in the air wet the individual even more, and the mud is usually ankle-deep in a matter of minutes.

It takes a minimum of several minutes to over an hour to complete the nozzle settings. This is a very unpleasant, time-consuming and tedious task. Once initially set, the rig is then generally driven forward while spraying only water. The individual who set the nozzles walks behind the rig and ascertains that the settings are correct. Generally, they are not right the first time and further correction is often necessary until all spray patterns and settings are correct.

At this time, the rig is taken to the end of the field and filled with the desired chemical formulation, and spraying is started. More often than not, it is found that one or more of the nozzles are still not quite set correctly. This presents an even greater problem. The same procedure must now take place as before, i.e., the spray must be turned on and the nozzle or nozzles adjusted while spraying. However, very expensive and very toxic chemicals are now being discharged. The toxicity not only affects the plants, but may injure the involved individuals as well. Moreover, all nozzles must be spraying while making the adjustments. Thus, all plants and weeds in the area receive a massive overdose of chemical that not only kills everything contacted by the spray, but sterilizes the ground for several years to come. This is in direct violation of the approved labeling and usage for the product being applied.

Subsequent rains and blowing dust, as well as cultivation, tend to spread the toxic soil in this area to a much larger area. The toxic overdose is also carried with runoff water into drainage systems, which, in turn, endangers many other species of plants, wildlife and fish. Moreover, this procedure will be repeated several times during the average spraying operation.

Other problems are also extant. For example, a nozzle may vibrate, loosen or become plugged in use, or an obstacle may be hit with a nozzle, thus moving it out of its adjusted set position. The errant nozzle must then be readjusted with the foregoing problems once again being encountered. This typical, but very crude, expensive and haphazard, operation constitutes a problem heretofore defiant of solution.

In accordance with the present invention, all of the above-identified and other faults and problems, associated with the setting of spray nozzles in an agricultural environment including the danger to man, crops and the surrounding environment, are minimized or eliminated. All of the spray nozzles, in accordance with the present invention, can be set for height, angle and proper coverage without the spray being activated. This eliminates or minimizes toxic overdoses, mud, and environmental problems as well as reduces the time and labor necessary to obtain proper accurate nozzle settings.

Briefly, the present invention includes a device, in the nature of a jig or template, formed either of metal, plastic or other material, or a combination thereof, that fits over the spray nozzle and is located or oriented in alignment with the spray pattern for that particular nozzle. The device is easily set to show the exact angle and area of coverage that the nozzle sprays, as well as the height required to achieve the desired width of spray at that angle. This is accomplished in part by adjustable indicators, i.e., arms, that extend from the device to define the desired width of the spray pattern by defining its lateral extremities. These arms lie in the same plane as the plane of the actual spray pattern of the nozzle. Thus, the device defines the lateral extremities of the spray pattern, without the necessity of spraying.

All nozzle settings can now be made without fluid flowing through the nozzle. Precise definition of the overlap of spray patterns is easily accomplished by using two or more of the devices. Each device can be set to complement the other for precise coverage without toxic materials being sprayed or the creation of mud and mess and with complete precision. A heretofore dangerous, costly and messy procedure can now be quickly and economically accomplished with complete accuracy.

In accordance with a preferred embodiment of the present invention, there is provided apparatus for determining the direction of a fluid spray pattern issuing from a fluid nozzle prior to flowing fluid through the nozzle, comprising a body, means carried by the body for releasably securing the body and the fluid nozzle one to the other in a predetermined orientation of the body relative to the nozzle spray pattern for that particular nozzle and means carried by the body including a pair of arms extending from the body and spaced one from the other to define the lateral extremities and, hence, direction of the spray pattern for the fluid nozzle whereby, upon adjustment of the fluid nozzle, the arms define the direction of the spray pattern of fluid to be issued through the nozzle in its adjusted position. Preferably, the arms are angularly adjustable relative to one another and detented in adjusted positions. Additionally, the body includes a pair of spaced opposed flat surfaces for clamping about the flats on opposite sides of nozzle projections whereby the device may be releasably clamped to the nozzle.

In a further aspect of the present invention, there is provided a method for adjusting the direction of a fluid spray pattern issuing from a fluid nozzle prior to flowing fluid through the nozzle including the steps of attaching to the nozzle in a predetermined orientation relative to the nozzle a device having projecting arms for defining the lateral extremities and hence direction of a spray pattern, adjusting the fluid nozzle to an adjusted position corresponding to a desired spray pattern direction as determined by the direction of the extent of the arms from the device; and removing the device from the nozzle before flowing fluid through the nozzle.

In a still further aspect of the present invention, there is provided a method for adjusting the direction of a fluid spray pattern issuing from a fluid nozzle prior to flowing fluid through the nozzle comprising the steps of locating adjacent a fluid nozzle and in a predetermined orientation relative thereto, a device having indicators spaced one from the other for defining the lateral extremities and, hence, direction of a fluid spray pattern and adjusting the fluid nozzle to an adjusted position corresponding to a desired spray pattern, as determined by the indicators.

Accordingly, it is a primary object of the present invention to provide apparatus and methods for accurately setting a spray nozzle for determining the direction of the spray pattern of the nozzle prior to flowing fluid through the spray nozzle.

These and further objects and advantages of the present invention will become more apparent upon reference to the following specification, appended claims and drawings.

BRIEF DESCRIPTION OF THE DRAWING FIGURES

DESCRIPTION OF THE DRAWING FIGURES

Figure 1:
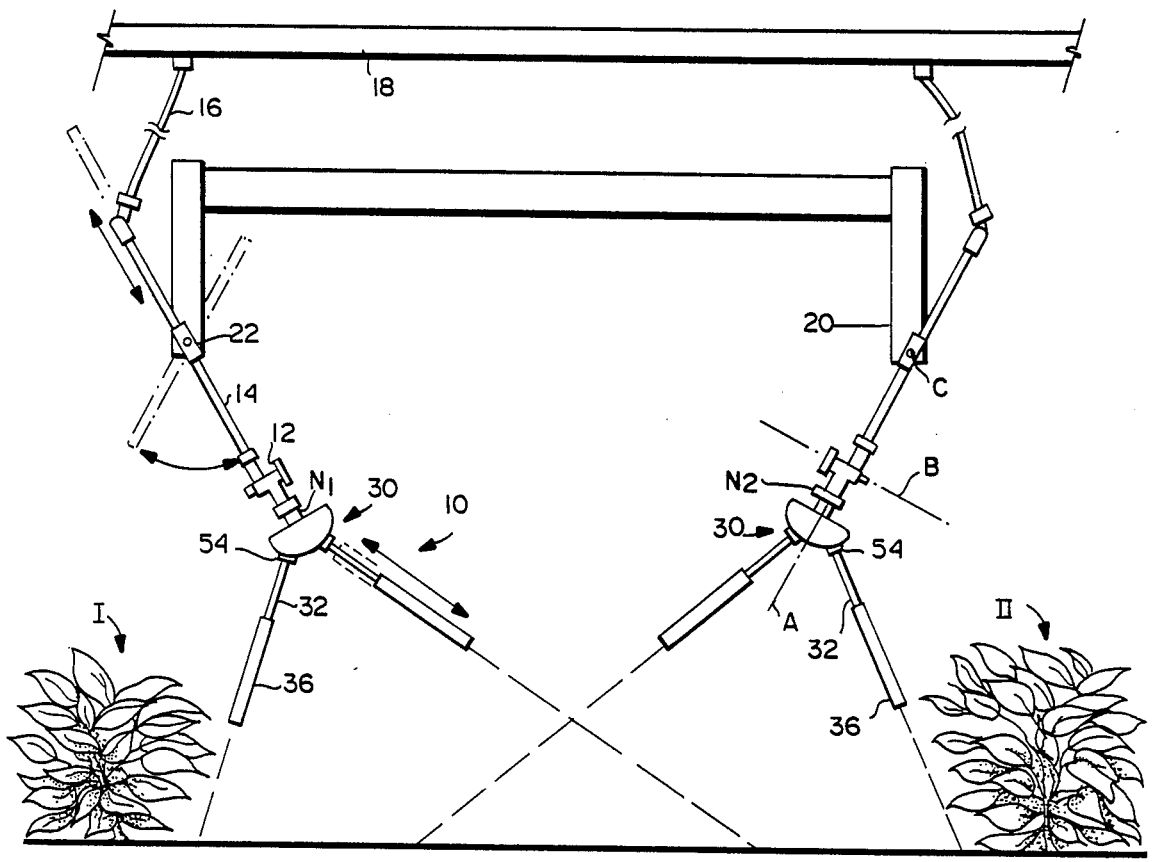
FIG. 1 is a rear elevational view of a portion of a spraying rig illustrating a pair of spray nozzles with the jigs or templates of the present invention applied to the nozzle tips for determining the direction of the spray patterns.
Figure 2:
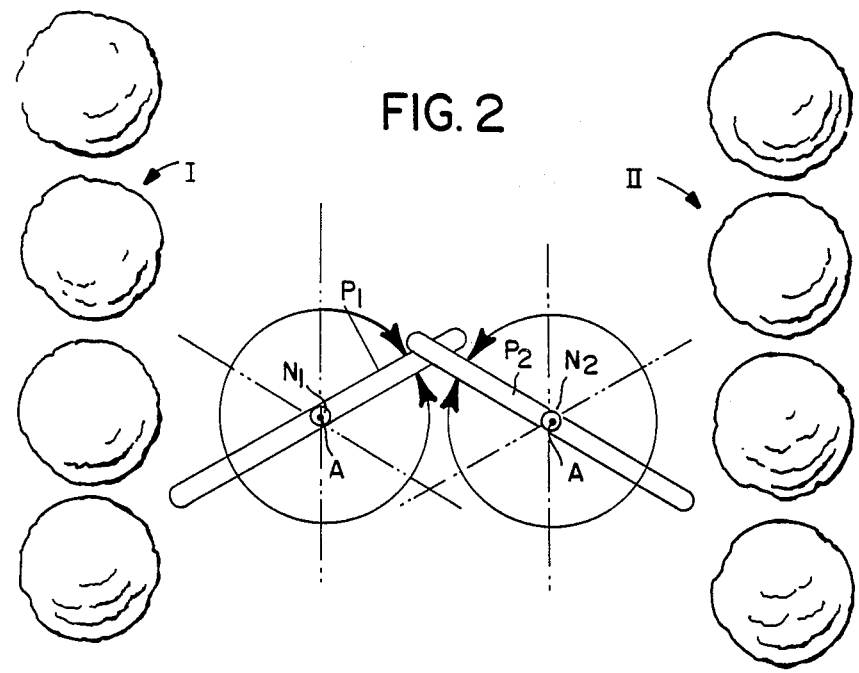
FIG. 2 is a schematic illustration in plan of a spray pattern, for example, as may be developed by a pair of spray nozzles of FIG. 1.
Figure 3:
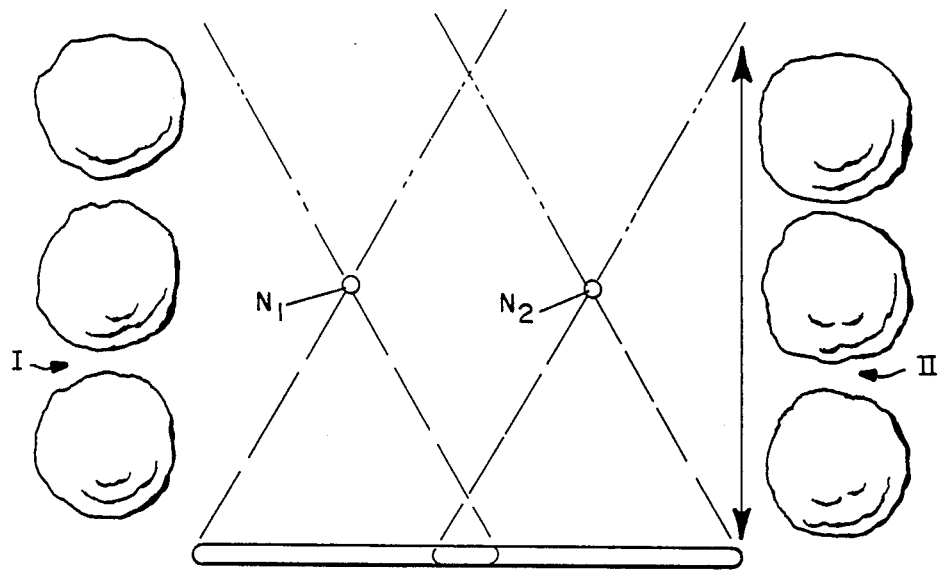
FIG. 3 is a view similar to FIG. 2 illustrating a different spray pattern using spray nozzles set at a different angle between the crop rows.

Referring now to FIG. 1, there is illustrated a pair of crop rows I and II spaced one from the other. Located between the crop rows I and II is a pair of nozzles N1 and N2 mounting identical jigs or templates constructed in accordance with the present invention and generally designated 10. Each of the nozzles N1 and N2 is connected through a pivotal coupling 12 to a pipe 14, the upper end of which lies in communication, through a flexible fluid conduit 16, with a header 18. As will be appreciated, header 18 contains a supply of fluid to be sprayed by nozzles N1 and N2. Pipe 14 is clamped to a bracket 20 by a pipe holder 22 which is pivotally mounted to bracket 20. Pipe holder 22 carries pipe 14 for axial movement into axially adjusted positions whereby the nozzle carried thereby can be raised or lowered as desired.

It will be appreciated that header 18 and the bracket 20 are disposed on and form part of a spraying rig normally towed behind a tractor, not shown. The spray nozzles N1 and N2 depend from bracket 20 and are supplied with fluid, for example, a weed killer, for spraying the row between crop rows I and II. Nozzles N1 and N2 are pivoted about their own axes A, in a manner discussed below, the nozzles and couplings being pivoted about generally normally related axes B and the pipes 14 being pivoted about normally related axes C. Thus, the nozzles are fully pivotally and elevationally adjustable into a wide variety of positions to achieve desired spray patterns. However, it is this adjustability which causes the problems alluded to above. It is therefore desirable to set the nozzles to obtain the desired spray pattern, for example, when using a weed killer, to spray the area between the crop rows I and II but not the rows of crops themselves.

For example, it may be desirable to direct the nozzles vertically downwardly. It will be appreciated, however, that if a spray pattern is used which, given the location of the nozzles, would spray the crop rows, the nozzles must be adjusted to direct the spray between the crop rows. In FIG. 2, a pair of nozzles are schematically illustrated, adjusted about their axes A, such that their spray patterns P1 and P2 are angularly related one to the other, forming an overlap along a central portion of the row between the crop rows. Absent this angular relation, the extent of the spray patterns might otherwise be sufficient to contact the crop rows with the weed killer, thereby killing the crop.

In FIG. 3, it may sometimes be desirable to provide a spray pattern forwardly or rearwardly of the direction of travel of the spraying rig. Consequently, the nozzles may be adjusted to an inclined position, either forwardly or rearwardly, pivoting about axes B at couplings 12 such that the nozzles spray forwardly or rearwardly. The pipes 14 may be adjustable in height relative to couplings 22 such that the nozzles may be disposed at various elevations relative to ground level. As indicated previously, it is desirable to be able to adjust the nozzles without spraying liquid from them, i.e., in a dry state, such that the spray pattern, when fluid is finally sprayed from the nozzles, can be determined.

Figure 5:
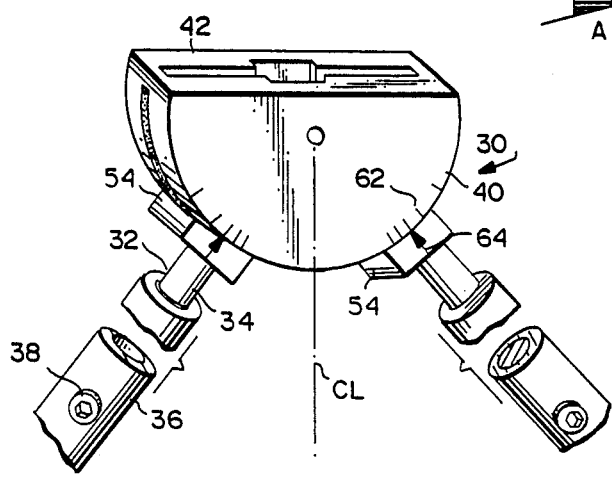
FIG. 5 is a fragmentary perspective view of the jig or template constructed in accordance with the present invention and illustrated with parts broken out and in cross-section.

To accomplish this, there is provided a jig or template, illustrated in FIG. 5 and generally designated 10, comprised of a head, generally indicated 30, which mounts a pair of arms 32. As illustrated, arms 32 project from the lower portion of body 30. Each arm is preferably comprised of a rod 34 having an overlying telescoping tubular section 36 with a set screw 38 by which the tubular portion 36 may be disposed on rod 34 in lengthwise adjusted position. As indicated earlier, and as will be appreciated from the ensuing description, arms 32 are angularly adjusted relative to one another to define the lateral extremities of the spray pattern for particular spray nozzle tips. That is, the nozzles may be provided with different spray tips T, as desired, each tip providing, for example, a fan-shaped spray pattern with a different spray angle than other nozzle tips. The lateral extremities of the spray pattern for each tip therefore may be replicated by angularly adjusting the arms 32. Arms 32 are adjustably mounted on body 30 such that their angular position relative to body 30 and one another may be adjusted in accordance with the particular spray nozzle tip T used on the spray nozzle. For example, a 65° spray tip nozzle may be provided. The arms 32 are therefore adjustably mounted along body 30 such that the angle between the arms 32 are 65° apart, i.e., each arm is 32.5° from the template centerline designated C.L. in FIG. 5.

To provide for adjustment of the arms into different angular positions to accommodate nozzle spray tips T having different spray pattern angles and to retain or detent the arms in the selected angular position, the body 30 is comprised of a pair of spaced, oppositely disposed, body portions 40 and 42. Each body portion 40 and 42 is generally in the form of a semi-circular disk. At opposite ends of the diameter thereof and facing inwardly toward the other body portion is a respective aperture 44 and a pin 46. Thus, when the two body portions 40 and 42 register one to the other, the pin 46 of one body portion is received in the aperture 44 of the other body portion. One or more additional pins and apertures may be provided about the periphery of the body portions as desired to ensure their registration one with the other. An elongated screw is provided through a central portion of the disks 40 and 42 and is secured, preferably by a wingnut 47, on one side of body 30 to secure the body portions one to the other with the pins and apertures in registration.

Along the inside surface of each body portion 40 and 42 is an arcuately shaped track 50. Track 50 is indented or recessed into the face of the body portion and defines an arcuate rim 52 radially outwardly of track 50.

Figure 6:
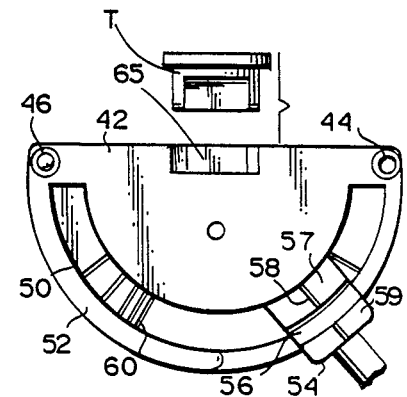
FIG. 6 is an enlarged side elevational view of the head of the jig or template, with one side removed, illustrating the manner of attachment of the nozzle tip and one of the directional indicators for the spray pattern.

Each arm 32 is provided with an associated mounting head 54. As best illustrated in FIG. 6, head 54 has an arcuate groove along opposite sides thereof corresponding in curvature to the curvature of arcuate rim 52. Consequently, when each head 54 is disposed between body portions 40 and 42, the arcuate grooves 56 on opposite sides of the head receive the arcuate ribs 52 of the body portions 40 and 42. The upper end of each head is also generally arcuately shaped along opposite sides to form arcuate projections 57. Projections 57 are received in the registering tracks 50 of the opposed body portions. In this manner, the heads and, hence, arms carried thereby, are slidable along an arcuate path defined by the tracks 50 and ribs 52.

To detent the heads 54 and, hence, arms 32 in adjusted angular positions, each head is provided with a lateral projection 58 which registers in an adjusted position with one of a plurality of grooves 60 formed along the face of each track 50. The grooves 60 are disposed at predetermined angular related positions along the track 50 corresponding to the various angles of spray provided by different nozzle spray tips T. Consequently, by loosening wingnut 47 from the bolt, each head may be arcuately adjusted along track 50 to locate its projections 58 in registering grooves 60 in tracks 50 corresponding to the desired angular position of the head. The body portions may then be tightly secured together, whereby registration of projections and grooves prevents further arcuate movement of the associated head along the tracks.

Figure 4:
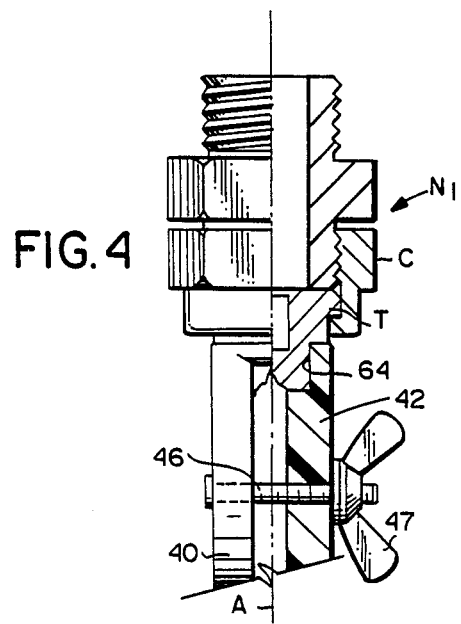
FIG. 4 is a fragmentary view, partly in cross-section and partly in elevation, illustrating the spray nozzle and tip and the connection between the nozzle tip and a jig or template constructed in accordance with the present invention.

To mount the jig or template 10 on the nozzle spray tip, there is provided a recess 65 along the inside upper surface of each of the body portions 40 and 42 corresponding in shape to the external shape of the nozzle tips T. Thus, the combined recesses of the body portions 40 and 42 provide a slot for receiving the nozzle tip T as illustrated in FIG. 4. The jig or template 10 may be secured to the nozzle tip T by loosening wingnut 47, enabling body 30 to be disposed such that the nozzle tip T is received within the slot. Thereafter, tightening the wingnut and bolt draws the body portions 40 and 42 together to provide a friction fit about nozzle tip T.

The various spray pattern angles of the spray nozzle tips are indicated along the outside face of at least one of the body portions by suitable indicia, such as indicated at 62, and the heads 54 also carry indicia, such as arrowheads 64, for registration therewith. Thus, by registering arrowhead 64 with one of indicia 62, arms 32 may be set at the desired adjusted angular relation one to the other.

When it is desired to adjust the spray nozzles, and hence the spray patterns, to spray liquid onto the space between the crop rows rather than onto the crop, the arms 32 of the jig or template 10 are angularly adjusted to correspond to the spray pattern angle of the spray tip T in use. For example, if a 5° spray tip T is used, arms 32 are adjusted by loosening the wingnut and bolt to loosen the body portions 40 and 42 whereby the heads can be adjusted along tracks 50 into the indicated corresponding angular positions. When the heads lie in the adjusted position for that spray tip, the body portions may be held together manually and applied to the particular spray nozzle tip such that the latter may be received in recess 65. The wingnut is then tightened so that the heads 54 are maintained in adjusted position with the jig or template secured to the spray nozzle.

The nozzle tip may be manipulated about the various axes previously described. For example, the nozzle tip may be rotated about axis B by unthreading coupling 12. Additionally, the coupling C of the nozzle spray tip T, as illustrated in FIG. 4, may be backed off such that the nozzle tip T may be rotated about its own axis A. In making these adjustments, it will be appreciated that the lateral extremities of the spray pattern as it impacts the ground between the crop rows is ascertained by the extension of the arms. This can be done by manually extending the arms by loosening the set screws and extending the telescoping sections 36 into engagement with the ground. Alternatively, the arms can be sighted along their axial extension to determine the lateral extremities of the spray pattern.

Once it is determined that the lateral extremities of the spray patterns are as desired, for example between the crop rows so that the spray will not contact the crops, the wingnut is loosened and the jig or template is removed from the spray tip. Each spray tip is similarly adjusted. In this manner, the extremities of the spray pattern is ascertained for each nozzle and adjusted without the necessity of spraying any liquid onto the ground.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for indicating direction of a fluid spray pattern characteristic of a fluid nozzle prior to flowing fluid through the nozzle, comprising:
   a body;
   means carried by said body for releasably securing said body and the fluid nozzle one to the other in a predetermined orientation of the body relative to the nozzle spray pattern characteristic for that particular nozzle; and
   means carried by said body including a pair of arms extending from said body and spaced one from the other to lie substantially coincident with and generally parallel to the lateral extremities of the spray pattern to thereby indicate the direction of the spray pattern characteristic of the fluid nozzle whereby, upon positional adjustment of the fluid nozzle, said arms define a new direction for the spray pattern of fluid to be issued through the nozzle in its adjusted position.

2. Apparatus according to claim 1 wherein said arms are adjustably spaced one from the other, said body and said arms having means cooperable one with the other to releasably secure said arms in adjusted positions relative to one another.

3. Apparatus according to claim 2 wherein said arms are angularly adjustably spaced one from the other, and further including indicia carried by said body indicating the angular relation of said arms relative to one another.

4. Apparatus according to claim 1 wherein said body includes a pair of members in opposition one to the other, and means disposed between said members for mounting said arms for movement relative to said body to adjust the spacing between said arms.

5. Apparatus according to claim 4 wherein said arms are angularly related one to the other, said mounting means enabling angular movement of said arms relative to one another and said body to adjust the angle therebetween, and means carried by said body and said arms cooperable one with the other for releaseably securing said arms in angularly adjusted positions relative to one another.

6. Apparatus according to claim 1 wherein said body includes a pair of frame members in opposition to one another, said frame members carrying surfaces in spaced opposition one to the other and configured to lie on opposite sides of the nozzle to releasably secure said body to the nozzle.

7. Apparatus according to claim 6 including an element engaging each frame member together with means cooperable with said element for urging said surfaces for movement toward one another to releasably clamp the nozzle therebetween.

8. Apparatus according to claim 1 wherein each of said arms is formed of sections whereby the length of the arms may be adjusted.

9. In combination with the apparatus of claim 1, said nozzle having a tip defined in part by a pair of projections having generally parallel flats along the outer sides thereof, and means carried by said body having corresponding flat surfaces for engaging respective nozzle flats upon securement of said body to said nozzles thereby to orient the body relative to the nozzle and the nozzle spray pattern.

10. The combination of claim 9 wherein said body includes a pair of frame members in opposition to one another with each frame member carrying a portion of said flat surface in spaced opposition to the flat surface of the other frame member to receive said nozzle projections therebetween.

11. The combination of claim 9 including means disposed between said members for mounting said arms in angular relation one to the other and for movement relative to said body to adjust the spacing between said arms, said mounting means enabling angular movement of said arms relative to one another and said body to adjust the angle therebetween, and means carried by said body and said arms cooperable one with the other for releasably securing said arms in angularly adjusted positions relative to one another.

12. Apparatus according to claim 1 wherein each of said arms is formed of a pair of sections telescopically receivable one within the other whereby the length of the arms may be adjusted.

13. A method for adjusting the direction of a fluid spray pattern issuing from a fluid nozzle prior to flowing fluid through the nozzle, comprising the steps of;
   attaching to the nozzle in a predetermined orientation relative to the nozzle a device having projecting arms for defining the lateral extremities and hence direction of an undeflected spray pattern;
   adjusted the fluid nozzle to an adjusted position to provide a spray pattern corresponding to a desired spray pattern direction as indicated by the direction of the extent of said arms from said device; and
   removing the device from the nozzle before flowing fluid through the nozzle.

14. A method according to claim 13 wherein said arms are angularly related one to the other and said nozzle has an aperture having a central axis which, when projected from the nozzle, bisects the angle between said arms, and including the step of adjusting the direction of the spray pattern of the nozzle by rotation thereof about said axis.

15. A method according to claim 13 wherein the nozzle has a nozzle tip providing a spray pattern having a predetermined, said spray pattern spray angle between lateral extremities thereof, and including the further step of adjusting the projecting arms to provide an angle of divergence therebetween corresponding to the predetermined spray angle of the nozzle tip.

16. A method for adjusting the position of a fluid spray pattern characteristic of a fluid nozzle prior to flowing fluid through the nozzle, comprising the steps of:
   locating adjacent a fluid nozzle and in a predetermined orientation relative thereto a device having indicators spaced one from the other for defining the lateral extremities of an undeflected fluid spray pattern characteristic of said nozzle; and displacing the fluid nozzle and the device positions so that the spray pattern characteristic of said nozzle corresponds to a desired spray pattern position as indicated by the indicators.

17. A method according to claim 16 wherein said indicators comprise arms angularly related one to the other and said nozzle has an aperture having a central axis, wherein the step of locating includes orienting the device such that the central axis of the nozzle bisects the angle between said arms.

18. A method according to claim 16 including spraying fluid through said nozzle only after the nozzle has been adjusted 19. A method according to claim 16 wherein the nozzle has a nozzle tip providing a spray pattern having a predetermined spray angle between lateral extremities thereof, and including the further step of adjusting the indicators to lie substantially coincident with the lateral extremities of the spray pattern for said nozzle tip.

* * * * *